United States Patent
Siessl et al.

(10) Patent No.: US 8,303,891 B2
(45) Date of Patent: Nov. 6, 2012

(54) METHOD FOR PRODUCING NON-CIRCULAR TOOTHED BELT PULLEYS OR SPROCKETS

(75) Inventors: Wolfgang Siessl, Traunkirchen (AT); Herbert Schmid, Vorchdorf (AT); Karl Dickinger, Vorchdorf (AT)

(73) Assignee: Miba Sinter Austria GmbH (AT)

( * ) Notice: Subject to any disclaimer, the term of this patent is extended or adjusted under 35 U.S.C. 154(b) by 696 days.

(21) Appl. No.: 12/440,961

(22) PCT Filed: Sep. 4, 2007

(86) PCT No.: PCT/AT2007/000421
§ 371 (c)(1),
(2), (4) Date: Sep. 21, 2009

(87) PCT Pub. No.: WO2008/031123
PCT Pub. Date: Mar. 20, 2008

(65) Prior Publication Data
US 2010/0006058 A1    Jan. 14, 2010

(30) Foreign Application Priority Data
Sep. 12, 2006 (AT) ................. A 1513/2006

(51) Int. Cl.
*B22F 5/05* (2006.01)
*F02B 67/06* (2006.01)
(52) U.S. Cl. ..................... 419/28; 123/198 R
(58) Field of Classification Search .............. 123/198 R; 419/28; 703/1; 474/166, 152
See application file for complete search history.

(56) References Cited

U.S. PATENT DOCUMENTS

| | | | |
|---|---|---|---|
| 4,036,073 A | 7/1977 | Kitano | |
| 4,504,202 A | 3/1985 | Saegusa | |
| 6,591,708 B2 * | 7/2003 | Kobayashi et al. | ............. 74/446 |
| 6,727,613 B2 * | 4/2004 | Saitou et al. | ................ 310/75 R |
| 6,921,994 B2 * | 7/2005 | Kawakami et al. | ......... 310/75 R |
| 6,974,021 B1 | 12/2005 | Boevers | |
| 7,698,964 B2 * | 4/2010 | Kashimura | ..................... 74/461 |
| 2005/0025951 A1 | 2/2005 | Gruber et al. | |

FOREIGN PATENT DOCUMENTS

| | | |
|---|---|---|
| DE | 2446172 | 4/1976 |
| DE | 2659733 | 7/1978 |
| DE | 10247330 | 4/2004 |
| DE | 102005008676 | 6/2006 |
| DE | 102005027103 | 12/2006 |
| GB | 2360825 | 10/2001 |
| JP | 2007217740 | 8/2007 |
| WO | 0048760 | 8/2000 |
| WO | 03046413 | 6/2003 |

OTHER PUBLICATIONS

International Search Report, PCT/AT2007/00421.

* cited by examiner

*Primary Examiner* — George Wyszomierski
*Assistant Examiner* — Michael Aboagye
(74) *Attorney, Agent, or Firm* — Lerner, David, Littenberg, Krumholz & Mentlik, LLP

(57) ABSTRACT

The invention describes a method of producing a compression mold profile (21) of a compression mold for a non-circular sintered chain wheel or cog belt wheel (1), whereby a compression mold profile (21) is set up by scaling a desired profile (19) of the chain wheel or cog belt wheel (1) with a scaling factor. The compression mold profile (21) is set up by applying a corrective shift applied in addition to scaling the desired profile (19).

15 Claims, 2 Drawing Sheets

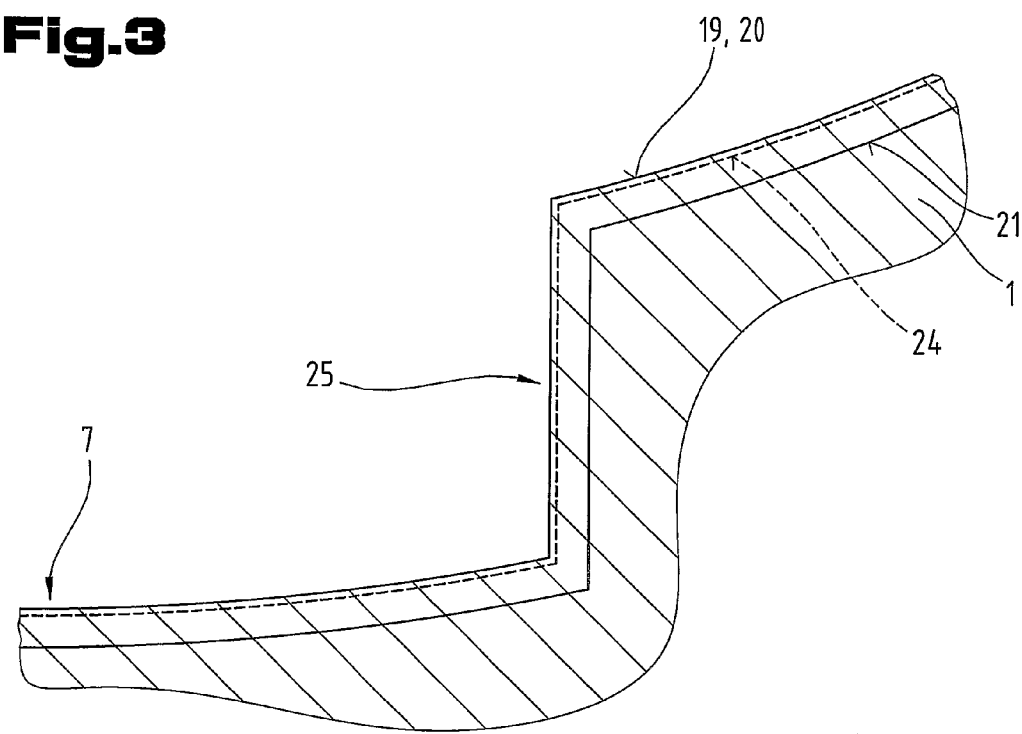
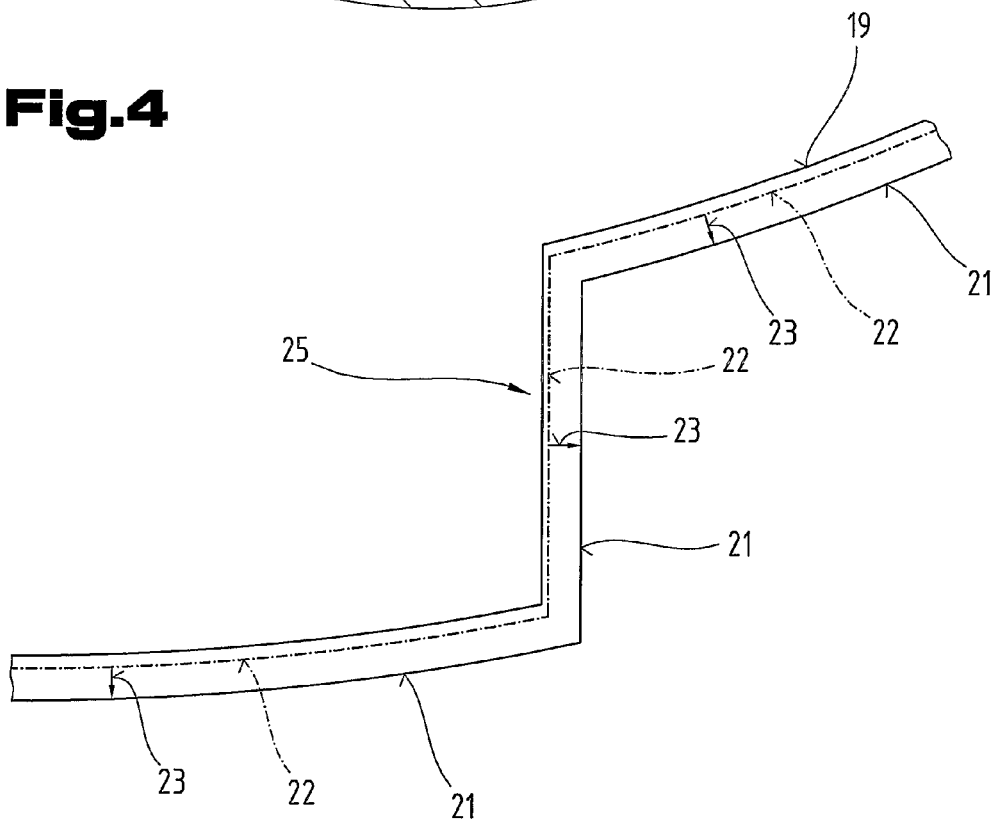

US 8,303,891 B2

METHOD FOR PRODUCING NON-CIRCULAR TOOTHED BELT PULLEYS OR SPROCKETS

CROSS REFERENCE TO RELATED APPLICATIONS

The present application is a national phase entry under 35 U.S.C. §371 of International Application No. PCT/AT2007/000421, filed 4 Sep. 2007, which claims the benefit of Austrian Patent Application No. A 1513/2006, filed 12 Sep. 2006. The disclosures of said applications are incorporated by reference herein.

BACKGROUND OF THE INVENTION

The invention relates to a method of producing a compression mould profile of a compression mould for a non-circular, sintered chain wheel or cog belt wheel based on the features defined in independent claim 1 as well as a method of producing a non-circular chain wheel or a non-circular cog belt wheel from powdered metal.

In drive systems, there are applications in which non-circular chain wheels or cog belt wheels are used with a view to producing specific effects. One such application is known from patent specification WO 03/046413 A1, for example, which discloses a synchronous drive comprising an endlessly circulating tensioning means and at least two rotary elements which engage with the tensioning means. In this instance, a fluctuating load torque acting on the second rotary element is largely compensated due to a non-circular design of the first rotary element, which transmits an opposing fluctuating drive torque of approximately the same magnitude via the tensioning means to the second rotary element. Such an arrangement may be used with a camshaft drive for example, as a means of reducing torsional oscillation of the driven camshaft as well as vibrations of the tensioning means.

Whereas sintering is commonly used to produce circular cog belt wheels or chain wheels in large batches by powder metallurgy, sintering methods have not been widely used to produce non-circular chain wheels or cog belt wheels to date because the fact that the finished component is non-circular means that the design of the mould used to make a chain wheel or a cog belt wheel by sintering using conventional methods is not satisfactory. In order to produce sintered components requiring no finishing process involving the removal of material to accurate dimensions, it is often necessary for them to be finished by a calibration process, in which case the compression mould used to produce the compact of powdered metal and the calibrating mould for calibrating the sintered component must be adapted to one another, which poses additional requirements with regard to the design of a compression mould. In particular, the design of the compression mould and its cross-sectional profile has a major influence on the result of the process used to produce sintered workpieces.

BRIEF SUMMARY OF THE INVENTION

Accordingly, the objective of the invention is to propose a method of producing a compression mould profile of a compression mould which enables non-circular, sintered chain wheels or cog belt wheels to be produced to a high degree of precision.

Throughout the rest of the description of the invention, the expression cog belt wheel will be used exclusively but the explanations equally apply to chain wheels.

This objective is achieved by the invention by a method incorporating the features defined in claim 1. By contrast with the prior art where the compression mould profile is set up by a simple scaling process based on a central extension of the desired profile of the cog belt wheel, the invention proposes applying an additional corrective shift in order to better adapt the compression mould profile to the dimensional changes which occur during a sintering process. The behaviour of the compact produced by the compression mould during the sintering process may involve shrinkage or expansion during the sintering process depending on the composition of the powdered metal, in particular depending on the copper content of the powdered metal.

In order to obtain the desired dimensions or the desired profile of the cog belt wheel at the end of the sintering process, the compression mould profile is made larger or smaller than the desired profile with the aid of scaling in order to counteract a change in dimensions which occurs during the sintering process. However, since the changes which occur in the sintered component during the sintering process in terms of shape and dimensions do not coincide with a central extension due to the non-circular design, the additional corrective shift of the compression mould profile enables the desired profile of the cog belt wheel to be more effectively adapted.

If the sintered cog belt wheel is subjected to a finishing process in the form of a calibration, it is necessary to be able to introduce the cog belt wheel axially into a calibrating mould. In order to calibrate an external circumference, such a calibrating mould has an internal diameter which is smaller by a small amount than a corresponding external diameter which has to be calibrated on the cog belt wheel. In particular, this amount more or less corresponds to the degree of elastic deformation of the cog belt wheel as it is being removed from the calibrating mould. During the actual calibration process, the cog belt wheel introduced into the calibrating mould with a clearance is axially compressed, as a result of which it is pressed against the wall surface of the calibrating mould so that its radial cross-section is increased whilst simultaneously increasing its axial length. As it is then being removed from the calibrating mould, the external diameter of the cog belt wheel increases again slightly due to the recurrence of elastic deformation and it is for this reason that the internal diameter of the calibrating mould is selected so that it is slightly smaller than the desired dimension of the cog belt wheel.

In the case of the internal diameter of the cog belt wheel, the reverse applies, i.e. the external diameter of a calibrating mould co-operating with an internal diameter of the cog belt wheel is slightly bigger than a desired dimension at an internal circumference of the cog belt wheel.

If a conventional design of compression mould profile were to be used for scaling with the desired profile disposed so that it extends centrally, the changes occurring in the sintered component caused by the sintering process would be bigger, especially at the tooth flanks of the cog belt wheel, than the shift in the desired profile brought about by the scaling process, which would result in an interference fit between the sintered cog belt wheel and the calibrating mould in the region of the tooth flanks, which would cause an enormous load on both the calibrating mould and the sintered component as it is introduced axially due to friction, thereby impairing the quality.

If, in the case of an external circumference of the cog belt wheel, the corrective shift is intended to achieve smaller external dimensions and/or in the case of an internal circumference of the cog belt wheel it is intended to achieve bigger internal dimensions, the dimensions of the sintered cog belt wheel are guaranteed to enable it to be introduced into the calibrating mould with sufficient clearance.

The corrective shift may take place around the entire circumference of the compression mould profile based on a constant amount, i.e. at an external circumference and/or an internal circumference of the compression mould profile, which offers a structurally simple way of achieving the corrective shift.

However, it is also possible for the corrective shift to be varied around the circumference of the compression mould profile because this enables the compression mould to be flexibly adapted to the special geometry of a specific cog belt wheel. For example, the amount of corrective shift at a specific point of the external circumference can be made dependent on the distance of the point from the axis of rotation of the cog belt wheel. Adapting the corrective shift means that it is also possible to influence those regions of the cog belt wheel which will sit in contact with a calibrating mould, in which case the calibration process can be controlled so that the tooth heads lie against the calibrating mould but the tooth base does not lie against it, for example.

In one practical variant, the corrective shift is applied normally with respect to the surface of the scaled compression mould profile, as a result of which the actual compression mould profile is equidistant from the scaled compression mould profile. Since modern CAD systems include functions for shifting a profile in this manner, it is a simple matter to perform such a corrective shift of this type.

In the case of a varying corrective shift, the corrective shift at the tooth flanks of the cog belt wheel may be bigger than at the tooth head and/or at the tooth base. Whereas full allowance is made for the change in diameter at the tooth head or at the tooth base due to scaling, the steepness at the tooth flanks of the cog belt wheel causes only a slight shift in the compression mould profile compared with the desired profile and for this reason it is of advantage to allow for a bigger corrective shift in these regions.

The corrective shift in the case of a sintered cog belt wheel is preferably selected from a range with a lower limit of 0.005 mm and an upper limit of 0.5 mm, thereby ensuring that a sintered cog belt wheel can be introduced into a calibrating mould without causing excessive frictional forces due to overlap or crossover. The upper limit of the range may be used in the case of bigger wheel diameters and bigger degrees of non-circularity for example, where sintering causes bigger dimensional changes.

In addition to setting the corrective shift in the form of absolute values, it may also be selected from a range with a lower limit of 0.05% and an upper limit of 1.0% of a given diameter, in which case a correlation is made between the corrective shift and the size of the cog belt wheel.

The compression mould profile may also be set up so that the selected scaling factor at a specific external circumference or diameter is bigger by the value of the corrective shift than it would be if scaling a standard compression mould profile without a corrective shift. This prevents too big a clearance from being created between the sintered cog belt wheel and calibrating mould due to the combination of scaling and additional corrective shift because both the corrective shift and scaling produce their full effect at the tooth head and at the tooth base. This can be prevented by reducing scaling by the amount of the subsequent corrective shift.

The corrective shift may also be applied in such a way that it increases as the angle between a tangent at a point of the compression mould profile and a radius vector from that point to a centre point of the scaling generally coinciding with the axis of rotation centre point decreases. This is another form of a non-uniform corrective shift around the circumference, by means of which a more pronounced corrective shift is imparted to radially oriented portions of the compression mould profile, whereas a less pronounced corrective shift is imparted to portions of the compression mould profile extending more at a tangent to a pitch circle of the cog belt wheel. This means that a more pronounced corrective shift can be imparted to the compression mould profile at the tooth flanks which point more in the direction towards the cog belt wheel centre, for example, whilst only a slight corrective shift is applied to the tangentially oriented tooth head. In this respect, a linear correlation can be established between the angle and the corrective shift, for example.

The objective of the invention is also achieved by a method of producing a non-circular cog belt wheel from powdered metal, comprising the method steps of compressing powdered metal in a compression mould to produce a compact, sintering the compact, axially compressing the sintered cog belt wheel in a calibrating mould, characterised in that the compression mould has a compression mould profile proposed by the invention as defined in one of claims 1 to 12. Such non-circular cog belt wheels are distinctive due to their high surface quality and dimensional stability, including at the tooth flanks, because the corrective shift proposed by the invention permits optimum adaptation between the compression mould and calibrating mould.

This adaptation can be even further improved by setting up a calibration profile for the calibrating mould by a scaling process and/or a corrective shift from the desired profile of the cog belt wheel. Since the cog belt wheel is intended to assume the desired profile once it has been removed from the calibrating mould, the calibration profile is set up by means of a simple scaling operation in most cases; however, because it is more difficult to predict what changes in shape and dimensions will occur during the sintering process in the case of a non-circular cog belt wheel, the certainty of obtaining a clearance between the sintered cog belt wheel and calibrating mould for introduction purposes can be increased by optionally applying a corrective shift.

BRIEF DESCRIPTION OF THE DRAWINGS

The invention will be described in more detail below with reference to examples of embodiments illustrated in the appended drawings.

These provide simplified, schematic diagrams of the following:

FIG. 3 a detail of the cog belt wheel in region III indicated in FIG. 1 together with the profile of internal splines of the cog belt wheel illustrated in FIG. 1;

FIG. 4 another way of setting up the profile of the compression mould in order to produce internal splines on a cog belt wheel illustrated in FIG. 1.

DETAILED DESCRIPTION OF THE PREFERRED EMBODIMENTS

Figure 1:
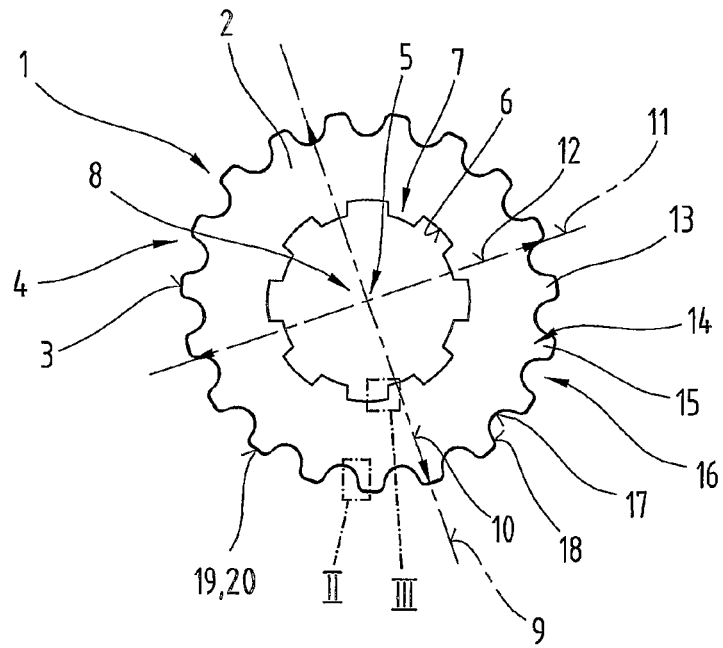
FIG. 1 a view of a non-circular cog belt wheel.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates a non-circular sintered cog belt wheel 1 produced using the method proposed by the invention. The cog belt wheel 1 in this instance comprises a wheel body 2 which is provided with toothing 4 at an external circumference 3. To enable the cog belt wheel 1 to be mounted on a shaft or similar, it has a bore 5 with internal splines 7 on an internal diameter 6. The centre of the bore 5 constitutes an axis of rotation 8 for the cog belt wheel 1.

In the embodiment illustrated as an example, the non-circularity of the cog belt wheel 1 is based on the fact that it has a maximum diameter 10 at a major axis 9 extending through the axis of rotation 8 which is bigger than a minimum diameter 12 measured at a minor axis 11 likewise extending through the axis of rotation 8. FIG. 1 shows the diameters at the addendum circle but the differences in diameter at the circumference of the cog belt wheel may equally be defined on the basis of the root line or pitch circle.

The non-circularity of the cog belt wheel 1 may also be interpreted as meaning that it has at least one bulge at its external circumference 3 extending out from a reference circle and one or more indentations extending inwards from a reference circle.

The toothing 4 at the external circumference 3 of the cog belt wheel 1 is provided in the form of a plurality of teeth 13 extending radially outwards. They are joined to the wheel body 2 by means of a tooth root 14 and are able to engage by means of a tooth head 15 in tooth gaps of a cog belt. The distance between two adjacently lying teeth 13 forms a tooth gap 16 which is bounded by a tooth base 17 and mutually facing tooth flanks 18 of two adjacent teeth 13. The tooth gaps 16 are designed to partially accommodate teeth of a cog belt co-operating with the cog belt wheel 1.

The illustrated cog belt wheel 1 is oval or elliptical but may also have more than two bulges or indentations with respect to a reference circle, depending on the application.

The toothing 4 on the external circumference 3 of the cog belt wheel 1 has a desired profile 19 determined by the construction, from which an actual profile 20 on the finished cog belt wheel 1 should deviate as little as possible. Due to the possible changes in dimensions which can occur in a sintered component during a sintering process, it is necessary to take special steps to achieve this. The composition of the powdered metal from which a compact is produced as well as processing parameters such as the temperature and pressure during sintering essentially determine the behaviour of a workpiece during the sintering operation. For example, it may be that the compact increases or decreases in volume during the sintering process or alternatively does not undergo any change in volume at all. If this behaviour is already known from values obtained previously, the actual profile 20 of a cog belt wheel 1 can be approximated with the desired profile 19 by changing the dimensions of a compression mould used to produce a compact compared with the desired profile 19 so that the variance from the desired profile 19 is largely cancelled out by the change in dimensions which occurs during the sintering process. For example, in order to produce a compact that will increase in volume during the sintering operation, a compression mould is used which is smaller than the desired profile 19.

Figure 2:
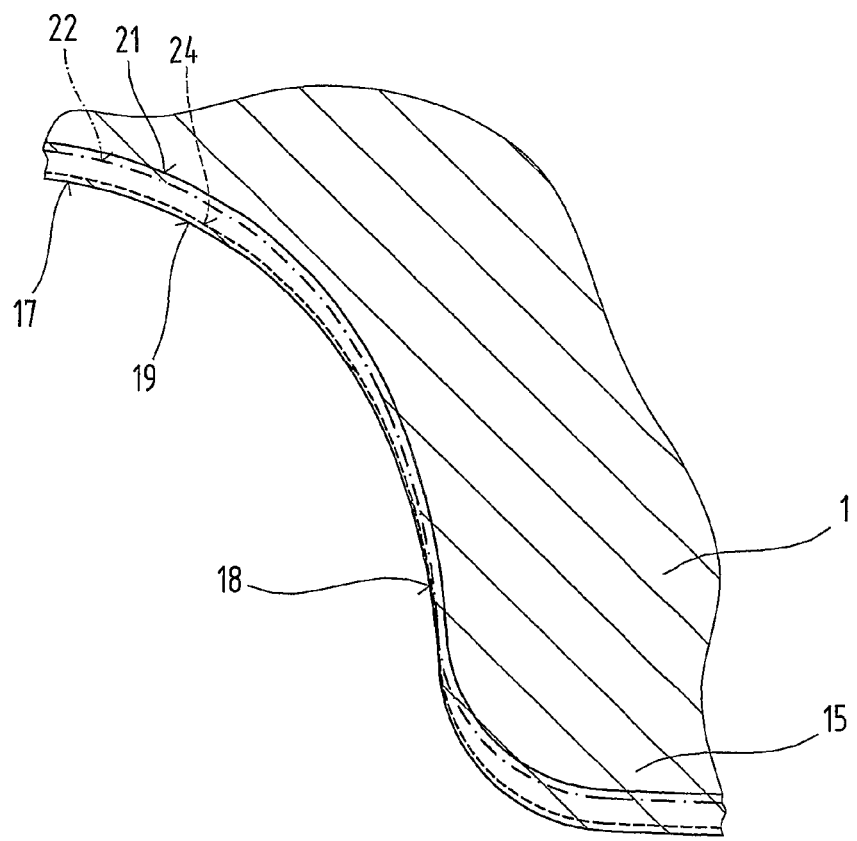
FIG. 2 a detail of a cog belt wheel along section II indicated in FIG. 1 together with the co-operating profiles of a compression mould and a calibrating mould.

These correlations are illustrated in FIG. 2, which shows a section II of the cog belt wheel 1 illustrated in FIG. 1. From this it may be seen that the desired profile 19 of the external circumference 3 merges from a tooth base 17 into a tooth flank 18 and runs to a tooth head 15. Since it is assumed that a bigger volume will be imparted to the sintered component than that of the compact during the sintering process in the embodiment illustrated as an example, the compression mould used to produce a compact must be smaller than the desired profile 19. This is achieved by a compression mould profile 21 of a compression mould, not illustrated as such, which is shifted relative to the desired profile 19 in the direction of the axis of rotation 8. This shift of the compression mould profile 21 relative to the desired profile 19 is generally referred to as scaling in the sintering industry and in structural terms is achieved on the basis of a central extension of the desired profile 19 with an extension centre in the axis of rotation 8. However, one property of such a central extension is that a profile line portion extending radially, i.e. in the direction of the axis of rotation 8 constituting the extension centre, goes back on itself, which means that there is no shift in the profile in a portion of this type.

As may be seen in FIG. 2, this is the case more or less in the region of the tooth flank 18, as shown by a dotted-dashed line indicating a standard compression mould profile 22. This is achieved solely by a central extension of the desired profile 19 aligned with the extension centre axis of rotation 8 and a scaling factor which has a value of less than 1, for example 0.99. Since the desired profile 19 in the region of the tooth flank 18 runs more or less in the direction of the axis of rotation 8, a central extension on its own results in only a short distance there between the desired profile 19 and the standard compression mould profile 22.

Due to the increase in volume that will occur during a sintering process, the actual profile in the region of the tooth flank 18 would project outwards from the desired profile 19 and would possibly lead to an unacceptable variance in dimensions and shape. In order to produce a compression mould profile 21 which makes it possible to anticipate a potential increase in volume which might occur during the sintering process, including at the tooth flanks 18 or more generally in more or less radially oriented profile portions, the simple scaling proposed by the invention is applied in conjunction with an additional corrective shift. In the embodiment illustrated as an example, this corrective shift is applied so that the compression mould profile 21 results in a situation of equidistance relative to the standard compression mould profile 22, i.e. the compression mould profile 21 relative to the standard compression mould profile 22 is shifted normally with respect to the standard compression mould profile 22 by a shift distance 23 of a constant amount around the entire external circumference 3.

It is particularly necessary to avoid any excessive dimension of the sintered cog belt wheel 1 if it has to be finished by a calibration process after the sintering process. In order to calibrate the sintered cog belt wheel 1, it is introduced axially into a calibrating mould with a calibration profile 24 which is slightly smaller than the desired profile 19 but which is bigger than the actual profile of the cog belt wheel 1 after the sintering process. During calibration, the cog belt wheel 1 is axially compressed, as a result of which the actual profile 20 is pushed radially outwards against the calibration profile 24. The calibration profile 24 is therefore slightly smaller than the desired profile 19 because once it has been removed from the calibrating mould, the cog belt wheel 1 undergoes a slight increase in volume due to an elastic element of the deformation, in other words increases in size. The calibration profile 24 may therefore depart from the desired profile 19 due to a central extension or may be equidistant from it, in which case the shift will in practice be within a range of between 0.002 and 0.5 mm, or may incorporate a combination of the two.

Setting up the compression mould profile 21 with an additional corrective shift causes the cog belt wheel 1 to be introduced into the calibrating mould with a slight running clearance, including in the region of the tooth flanks 18, which would not be possible if no additional corrective shift were applied, and instead, there would be a lot of friction between the cog belt wheel 1 and the calibrating mould in the region of the tooth flanks 18.

FIG. 3 illustrates detail III from FIG. 1, showing how the compression mould profile 21 is set up at an internal circumference 6 of a cog belt wheel 1.

In the embodiment illustrated as an example in FIG. 3, it is assumed that the sintered cog belt wheel 1 will decrease in volume compared with that of the compact and hence also in dimensions, which in turn is determined by the composition of the powdered metal and the way the process is conducted during sintering. Since the internal diameter of the internal splines 7 must not be smaller than the desired profile 19 but the cog belt wheel 1 becomes smaller during the sintering process, the compression mould for producing the compact must be of bigger dimensions than the desired profile 19. The co-operating compression mould profile 21 is therefore based on the desired profile 19 using scaling in the form of central extension followed by a corrective shift. As a result, it may be seen that there is a significant distance between the desired profile 19 and the compression mould profile 21, including in the region of a spline flank 25 of the internal spline 7. To finish the sintered cog belt wheel 1, it is again possible to perform a calibration, and the calibration profile 24 is indicated by a broken line.

FIG. 4 again shows in detail how the compression mould profile 21 is created from the desired profile 19 by correlating scaling in the form of a central extension by reference to the axis of rotation 8—indicated by the dotted-dashed line of the standard compression mould profile 22—followed by a corrective shift by the shift distance 23 in the direction of a reduction in the size of the cog belt wheel 1.

In the embodiment illustrated as an example, the shift obtained by scaling is only very slight, whereas the increase in size of the standard compression mould profile 22 created by the corrective shift with respect to the compression mould profile 21 accounts for the major part of the difference between the desired profile 19 and the compression mould profile 21.

Non-circular steel gears are used as a means of transmitting non-uniform rotating movements, e.g. for press drives, etc. They are also used for specifically compensating imbalance in rotation in balancing applications (e.g. "Use of non circular gears for crankshaft Torque Balancing" IC Engines, VDI Reports 1904, 2005).

The rotating movement of internal combustion engines exhibits rotational imbalance. This rotational imbalance leads to additional loads in control drives and in the drives of auxiliary units. One possible way of reducing these torsional vibrations is to use an additional damper or compensator. Since this represents an extra component, it results in weight and cost disadvantages.

Particularly in the case of diesel engines, steel gears are used in control drives or for driving auxiliary units. These drives are characterised by tight mounting space and high power density. Again with these drives, torque fluctuations and rotational imbalance can be reduced by opting for a non-circular design of the gears. In manufacturing terms, however, it is only possible to produce steel gears with an eccentric bore on an economic scale.

In the case of belt drives, it is known that rotational imbalances can also be compensated to a certain degree by imparting a specific non-circularity to the gears, thereby enabling load on the drive as a whole to be reduced. Given the relatively low specific load, these gears may be made by powder metallurgy.

Compared with steel gears, non-circular gears or toothed elements made from sintered materials offer an advantage in that they can be produced to virtually any design of non-circularity using the moulding options available in the sintering industry and can be so more economically, in other words more cost effectively. Using this design of sintered gears, any rotational fluctuations in uniform rotating movements can be converted and any torque fluctuations which exist (e.g. in high-pressure pumps) can be reduced by opting for a non-uniform drive. This also enables loads in geared drives to be reduced, thereby increasing the service life of such systems.

In particular, non-circular sintered gears of this type can be produced using the method proposed by the invention.

Another advantage is the fact that the strength of sintered materials can be improved by using a compaction process. This increase in strength or density may be produced across the whole component cross-section or at the toothing region only. For example, calibration processes or rolling methods may be used for compaction purposes and the finished gear can be compacted in dies, i.e. in stages with the help of stepped or multi-stage dies. This makes it possible to achieve densities close to the solid material density, i.e. densities which vary by a maximum of 10%, preferably a maximum of 5%, in particular by a maximum of 3% from the density of a comparable component produced by molten metallurgy. This variance may be limited to the surface or superficial regions of the sintered gear, in which case the sintered gear will have a lower core density. It is therefore also possible to use non-circular sintered gears in drives which, by contrast with belt drives, are subjected to a higher mechanical load.

As proposed by the invention, it is also possible to manufacture sintered gears with a central bore for accommodating a shaft hub, thereby simplifying the assembly of such drives.

The sintered gears used in the manner proposed by the invention may be produced using powdered steel, for example, which may optionally be pre-alloyed, for example with medium to readily compressible iron powder mixtures containing chromium in a proportion of up to 4% by weight and with a total of up to 10% by weight of metallic non-ferrous alloying elements, up to 5% by weight of graphite, up to 3% by weight of compacting agents and up to 1% by weight of organic binding agents. These mixtures are either made up beforehand in a highly concentrated form as a so-called master batch, optionally also using temperature and solvents, and then added to powdered iron, or the individual elements are added directly to the powdered iron.

Pre-alloying elements may be Cr, Mo, V, Si, Mn.

Hybrid alloy powders may be Cr—Mo, pre-alloyed Fe-powder with diffusion-alloyed Ni and/or Cu, Mo pre-alloyed Fe-powder with Ferro-Cr and Ferro-Mn, even if these are diffusion-alloyed.

It is also possible to harden or temper these sintered gears.

It would also be possible to use other, commercially available sintering materials.

Sintered gears have another advantage over steel gears in that they exhibit better acoustic behaviour for a similar geometry. The reasons for this reside in increased component damping and in the optionally reduced tooth stiffness.

Potential applications for such non-circular sintered gears are in internal combustions engines driven by sintered gears or in a drive train, such as coupling drives of camshafts, drives of fuel pumps, drives of control drives, driving auxiliary units (e.g. generators, air conditioning compressors, oil pumps, water pumps, etc.), engine outputs generally (connection of engine and gearbox in the case of motorcycles). These are all non-belt drives.

The embodiments illustrated as examples represent possible design variants of the method of producing a compression mould profile of a compression mould for a non-circular sintered cog belt wheel, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the way the compression mould profile is set up, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in Figs. FIGS. 1, 2; 3; 4 constitute independent solutions proposed by the invention in their own right. The objectives and associated solutions proposed by the invention may be found in the detailed descriptions of these drawings.

LIST OF REFERENCE NUMBERS

1 Chain wheel
2 Wheel body
3 External circumference
4 Toothing
5 Bore
6 Internal circumference
7 Internal splines
8 Axis of rotation
9 Major axis
10 Maximum diameter
11 Minor axis
12 Minimum diameter
13 Tooth
14 Tooth root
15 Tooth head
16 Tooth gap
17 Tooth base
18 Tooth flank
19 Desired profile
20 Actual profile
21 Compression mould profile
22 Standard compression mould profile
23 Shift distance
24 Calibration profile
25 Spline flank

The invention claimed is:

1. A method of producing a compression mould profile of a compression mould for a non-circular sintered chain wheel or cog belt wheel, whereby a compression mould profile is set up by scaling a desired profile of the chain wheel or cog belt wheel with a scaling factor, wherein the compression mould profile is set up by applying a corrective shift in addition to scaling the desired profile.

2. The method as claimed in claim 1, wherein the corrective shift is applied with a view to obtaining smaller external dimensions in the case of an external circumference of the chain wheel or cog belt wheel.

3. The method as claimed in claim 1, wherein the corrective shift is applied with a view to obtaining bigger internal dimensions in the case of an internal circumference of the chain wheel or cog belt wheel.

4. The method as claimed in claim 1, wherein the corrective shift is applied around the entire circumference of the compression mould profile by a constant amount.

5. The method as claimed in claim 1, wherein the corrective shift is varied around the circumference of the compression mould profile.

6. The method as claimed in claim 1, wherein the corrective shift is applied normally with respect to the surface of the scaled desired profile.

7. The method as claimed in claim 5, wherein the chain wheel or cog belt wheel include tooth flanks, the corrective shift at the tooth flanks is bigger than at a tooth head and/or at a tooth base.

8. The method as claimed in claim 1, wherein the corrective shift is selected from a range with a lower limit of 0.001 mm and an upper limit of 0.5 mm.

9. The method as claimed in claim 1, wherein the corrective shift is selected from a range with a lower limit of 0.05% and an upper limit of 1.0% of a given diameter.

10. The method as claimed in claim 1, wherein the scaling factor is selected so that it is bigger or smaller by the value of the corrective shift than would be the case if scaling a standard compression mould profile without applying a corrective shift.

11. The method as claimed in claim 1, wherein the corrective shift increases as the angle between a tangent at a point of the compression mould profile and a radius vector from this point to a centre point of the scaling decreases.

12. The method as claimed in claim 1, wherein the scaling factor is variable around the circumference of the chain wheel or cog belt wheel.

13. A method of producing a non-circular chain wheel or cog belt wheel from powdered metal comprising the method steps of compressing powdered metal in a compression mould to obtain a compact, sintering the compact, axially compressing the sintered chain wheel or cog belt wheel in a calibrating mould, wherein the compression mould has a compression mould profile set up by applying a corrective shift and by scaling a desired profile of the chain wheel or cog belt wheel with a scaling factor.

14. The method as claimed in claim 13, wherein a calibration profile of the calibrating mould is set up on the basis of the desired profile of the chain wheel or cog belt wheel by scaling and/or a corrective shift.

15. A method of producing a non-circular sintered gear from powdered metal comprising the method steps of compressing powdered metal in a compression mould to obtain a compact, sintering the compact, axially compressing the sintered gear in a calibrating mould, wherein the compression mould has a compression mould profile set up by applying a corrective shift and by scaling a desired profile of the gear with a scaling factor.

* * * * *